United States Patent
Zhang et al.

(10) Patent No.: US 11,322,901 B2
(45) Date of Patent: May 3, 2022

(54) INJECTION MOLD

(71) Applicant: CHENG UEI PRECISION INDUSTRY CO., LTD., New Taipei (TW)

(72) Inventors: Yun-Feng Zhang, Dong-Guan (CN); Zhi-Bin Dong, Dong-Guan (CN); Feng Zhu, Dong-Guan (CN)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 713 days.

(21) Appl. No.: 16/361,191

(22) Filed: Mar. 21, 2019

(65) Prior Publication Data

US 2020/0014165 A1   Jan. 9, 2020

(30) Foreign Application Priority Data

Jul. 9, 2018   (CN) .......................... 201821078303.5

(51) Int. Cl.
   *B29C 45/14*     (2006.01)
   *H01R 43/24*    (2006.01)
   *B29C 45/64*     (2006.01)
   *B29C 45/26*     (2006.01)
   *B29L 31/36*     (2006.01)

(52) U.S. Cl.
   CPC ............ *H01R 43/24* (2013.01); *B29C 45/26* (2013.01); *B29C 45/64* (2013.01); *B29L 2031/36* (2013.01)

(58) Field of Classification Search
   CPC ........ B29C 45/14655; B29C 45/14639; B29C 45/14065; B29C 45/14819; B29C 45/14426; H01R 43/24
   See application file for complete search history.

(56) References Cited

U.S. PATENT DOCUMENTS

| 4,395,375 A | * | 7/1983 | Ferris ..................... | H01R 43/24 264/261 |
| 4,398,785 A | * | 8/1983 | Hedrick ................ | H01R 43/24 439/736 |
| 5,182,032 A | * | 1/1993 | Dickie .............. | B29C 45/14639 249/91 |
| 5,604,979 A | * | 2/1997 | Sawada .................. | H01R 43/24 264/277 |
| 5,926,952 A | * | 7/1999 | Ito ..................... | B29C 45/14639 439/736 |

(Continued)

*Primary Examiner* — Timothy Kennedy
(74) *Attorney, Agent, or Firm* — Cheng-Ju Chiang

(57) ABSTRACT

An injection mold for molding an electrical connector assembly which includes a plurality of terminals, a clamping component located above the plurality of the terminals, and a base body fastened to the plurality of the terminals and the clamping component. The injection mold includes a lower mold and an upper mold. The lower mold has a plurality of lower terminal grooves. Lower portions of the plurality of the terminals are placed in the plurality of the lower terminal grooves. The clamping component is placed on the lower mold. The upper mold is engaged with and mounted on the lower mold. A molding cavity is formed between the upper mold and the lower mold. The upper mold has a plurality of upper terminal grooves. Upper portions of the plurality of the terminals are placed in the plurality of the upper terminal grooves.

18 Claims, 10 Drawing Sheets

(56) References Cited

U.S. PATENT DOCUMENTS

| | | | | |
|---|---|---|---|---|
| 5,971,733 A * | 10/1999 | Huang | .............. | B29C 45/14639 |
| | | | | 425/127 |
| 8,118,583 B2 * | 2/2012 | Nagashima | ....... | B29C 45/14418 |
| | | | | 425/467 |
| 2004/0101587 A1 * | 5/2004 | Nix | ................... | B29C 45/14598 |
| | | | | 425/468 |
| 2004/0142597 A1 * | 7/2004 | Mizutani | ........... | B29C 45/14836 |
| | | | | 439/606 |
| 2011/0262582 A1 * | 10/2011 | Wu | ..................... | B29C 45/0046 |
| | | | | 425/542 |
| 2011/0287120 A1 * | 11/2011 | Gong | ...................... | B29C 33/12 |
| | | | | 425/123 |
| 2011/0293768 A1 * | 12/2011 | Wu | .................. | B29C 45/14065 |
| | | | | 425/150 |
| 2012/0195991 A1 * | 8/2012 | Cai | ................... | B29C 45/14836 |
| | | | | 425/129.1 |
| 2013/0064914 A1 * | 3/2013 | Gong | ............... | B29C 45/14065 |
| | | | | 425/3 |

* cited by examiner

INJECTION MOLD

CROSS-REFERENCE TO RELATED APPLICATION

The present application is based on, and claims priority from, China Patent Application No. 201821078303.5, filed Jul. 9, 2018, the disclosure of which is hereby incorporated by reference herein in its entirety.

BACKGROUND OF THE INVENTION

1. Field of the Invention

The present invention generally relates to an injection mold, and more particularly to an injection mold with a fixing function and capable of improving a production yield.

2. The Related Art

With reference to FIG. 9 and FIG. 10, a conventional injection mold 100' includes a lower mold 1' and an upper mold 2'. A rear of a top portion of the lower mold 1' has a plurality of lower terminal grooves 15'. A bottom of the upper mold 2' has a plurality of upper terminal grooves 231'.

A purpose of the conventional injection mold 100' is to manufacture an electrical connector assembly 200'. The electrical connector assembly 200' includes a plurality of terminals 4', a clamping component 5' and a base body 6'. The base body 6' is integrally molded in middles of the plurality of the terminals 4' and the clamping component 5' in the injection mold 100'.

When the conventional injection mold 100' manufactures the electrical connector assembly 200', lower portions of the plurality of the terminals 4' are placed in the plurality of the lower terminal grooves 15', respectively, and the clamping component 5' is positioned above the plurality of the terminals 4'. Then, the upper mold 2' is covered to the lower mold 1' along an up-down direction to make the upper mold 2' engaged with the lower mold 1'. At the moment, upper portions of the middles of the plurality of the terminals 4' are placed in the plurality of the upper terminal grooves 231'. At last, the base body 6' is molded to the plurality of the terminals 4' and the clamping component 5' in the conventional injection mold 100', so that the electrical connector assembly 200' is completed being manufactured.

However, when the upper mold 2' is engaged with the lower mold 1', the conventional injection mold 100' can just clamp the middles of the plurality of the terminals 4'. When the base body 6' is molded in the conventional injection mold 100', a mold flow of the conventional injection mold 100' easily affects the plurality of the terminals 4'. As a result, a displacement of the plurality of the terminals 4' is caused, and defective products are generated.

Therefore, it is necessary to provide a new-typed injection mold with a fixing function and capable of improving a production yield, the new-typed injection mold can fully fix a plurality of terminals of an electrical connector assembly, so that the plurality of the terminals are without being affected by a mold flow of the new-typed injection mold when the plurality of the terminals are molded to a base body of the electrical connector assembly, and the electrical connector assembly may be stably and well manufactured.

SUMMARY OF THE INVENTION

An object of the present invention is to provide an injection mold adapted for molding an electrical connector assembly which includes a plurality of terminals, a clamping component located above the plurality of the terminals, and a base body fastened to the plurality of the terminals and the clamping component. The injection mold includes a lower mold and an upper mold. A top of the lower mold has a plurality of lower terminal grooves recessed downward. Two sides of the top of the lower mold protrude upward to form two limiting blocks. Lower portions of the plurality of the terminals are placed in the plurality of the lower terminal grooves. The clamping component is placed on the lower mold. The two limiting blocks abut against two inner sides of the clamping component. The upper mold is engaged with and mounted on the lower mold. A molding cavity is formed between the upper mold and the lower mold for molding the base body to the plurality of the terminals and the clamping component. A bottom of the upper mold has a plurality of upper terminal grooves recessed upward. Each of the plurality of the upper terminal grooves is corresponding to one of the plurality of the lower terminal grooves. Upper portions of the plurality of the terminals are placed in the plurality of the upper terminal grooves. The bottom of the upper mold protrudes downward to form an abutting block. A bottom of the abutting block abuts against front ends of the upper portions of the plurality of the terminals, the plurality of the terminals and the clamping component are fixed between the upper mold and the lower mold firmly in a process of molding the base body to the plurality of the terminals and the clamping component.

Another object of the present invention is to provide an injection mold adapted for molding an electrical connector assembly which includes a plurality of terminals, a clamping component, and a base body fastened to the plurality of the terminals and the clamping component. The injection mold includes a lower mold and an upper mold. A top of the lower mold has a plurality of lower terminal grooves recessed downward. Lower portions of the plurality of the terminals are placed in the plurality of the lower terminal grooves. A rear of a top surface of the lower mold is defined as an accommodating surface. The upper mold is engaged with and mounted on the lower mold. A molding cavity is formed between the upper mold and the lower mold for molding the base body to the plurality of the terminals and the clamping component. A bottom of the upper mold has a plurality of upper terminal grooves recessed upward. Each of the plurality of the upper terminal grooves is corresponding to one of the plurality of the lower terminal grooves. Upper portions of the plurality of the terminals are placed in the plurality of the upper terminal grooves. The bottom of the upper mold protrudes downward to form an abutting block. A bottom of the abutting block abuts against front ends of the upper portions of the plurality of the terminals. A fixing block is placed on the accommodating surface, two sides of a top surface of the fixing block protrude upward to form two supporting blocks, a top surface of each supporting block is recessed downward to form a fixing slot, a material belt formed on a rear of the clamping component, the material belt has a connecting portion bent upward and then extending rearward from the rear of the clamping component, and a fastening portion extended transversely and oppositely from rears of two sides of the connecting portion, two ends of the fastening portion are assembled in the two fixing slots of the two supporting blocks, the plurality of the terminals and the clamping component are fixed between the upper mold and the lower mold firmly in a process of molding the base body to the plurality of the terminals and the clamping component.

Another object of the present invention is to provide an injection mold adapted for molding an electrical connector assembly which includes a plurality of terminals, a clamping component, and a base body fastened to the plurality of the terminals and the clamping component. The injection mold includes a lower mold and an upper mold. A top of the lower mold has a plurality of lower terminal grooves recessed downward. Two sides of the top of the lower mold protrude upward to form two limiting blocks. Lower portions of the plurality of the terminals are placed in the plurality of the lower terminal grooves. The clamping component is placed on the lower mold. The two limiting blocks abut against two inner sides of the clamping component. The lower mold defines a plurality of limiting slots penetrating through a top surface of the lower mold. The upper mold is engaged with and mounted on the lower mold. A molding cavity is formed between the upper mold and the lower mold for molding the base body to the plurality of the terminals and the clamping component. A bottom of the upper mold has a plurality of upper terminal grooves recessed upward. Each of the plurality of the upper terminal grooves is corresponding to one of the plurality of the lower terminal grooves. Upper portions of the plurality of the terminals are placed in the plurality of the upper terminal grooves. The bottom of the upper mold protrudes downward to form an abutting block. A bottom of the abutting block abuts against front ends of the upper portions of the plurality of the terminals, the plurality of the terminals and the clamping component are fixed between the upper mold and the lower mold firmly in a process of molding the base body to the plurality of the terminals and the clamping component. A processing component which cooperates with the injection mold to manufacture the electrical connector assembly, includes a fixing block, and a plurality of positioning portions formed at rears of the plurality of the terminals, a lower portion of each positioning portion is limited in one of the plurality of the limiting slots, several portions of a bottom surface of the fixing block are recessed upward to form a plurality of insertion slots, an upper portion of each positioning portion is placed in one of the plurality of the insertion slots.

As described above, a front of the upper mold of the injection mold is equipped with the abutting block, when the electrical connector assembly is manufactured in the injection mold, the bottom of the abutting block abuts against the front ends of the upper portions of the plurality of the terminals, and the two sides of the abutting block abut against the inner sides of the two clamping portions of the clamping component, the plurality of the terminals and the clamping component may be more firmly fixed in the injection mold, so that in an injection molding process of the base body, the plurality of the terminals are prevented from generating a displacement by an influence of the mold flow, and the electrical connector assembly may be stably and well manufactured. As a result, a production yield of the electrical connector assembly is improved during a mass production process.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
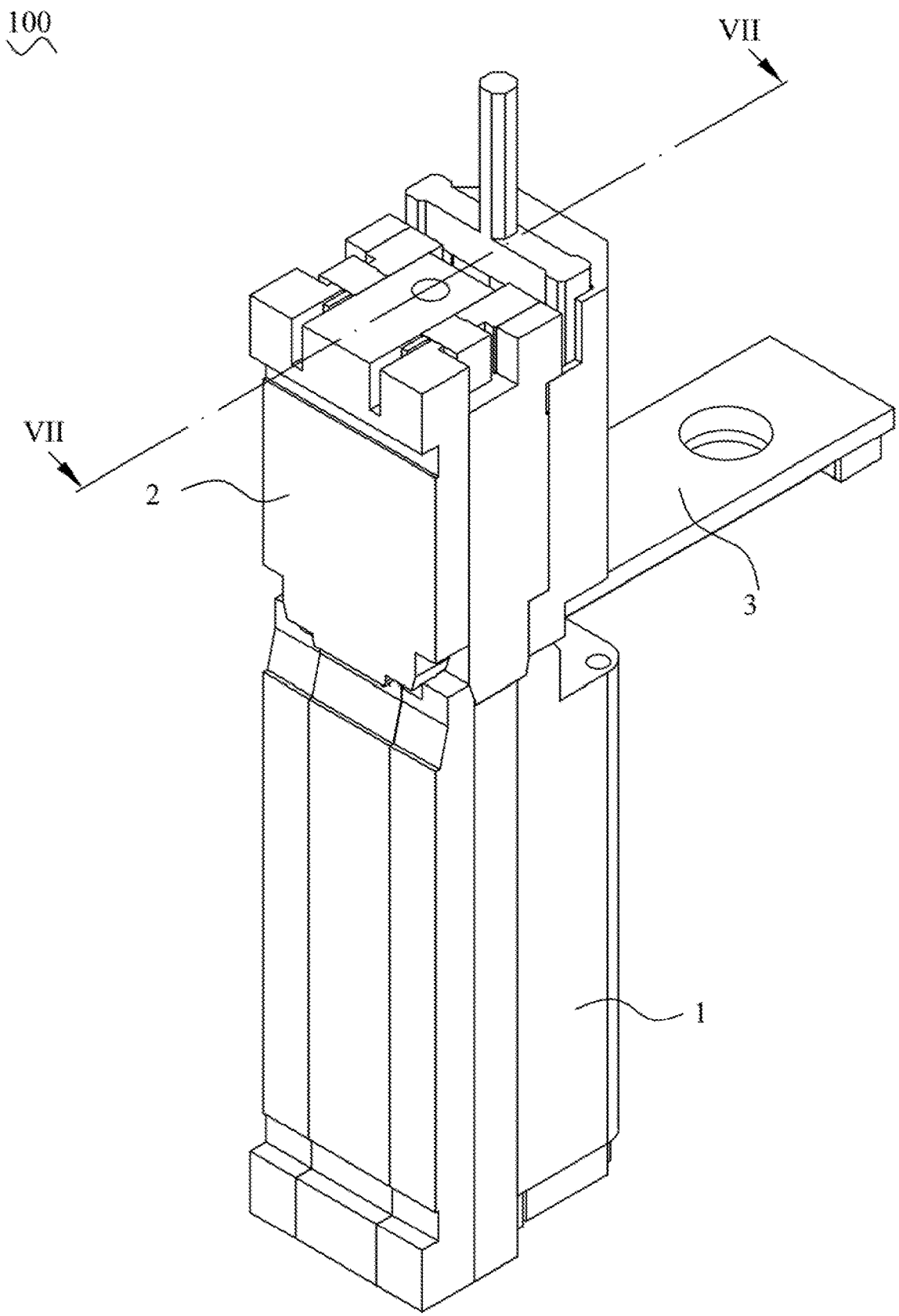
FIG. 1 is a perspective view of an injection mold in accordance with a preferred embodiment of the present invention.

With reference to FIG. 1, an injection mold 100 in accordance with a preferred embodiment of the present invention is shown. The injection mold 100 adapted for molding an electrical connector assembly 200, includes a lower mold 1, an upper mold 2, and a filling block 3 cooperating with the lower mold 1 and the upper mold 2.

Figure 2:
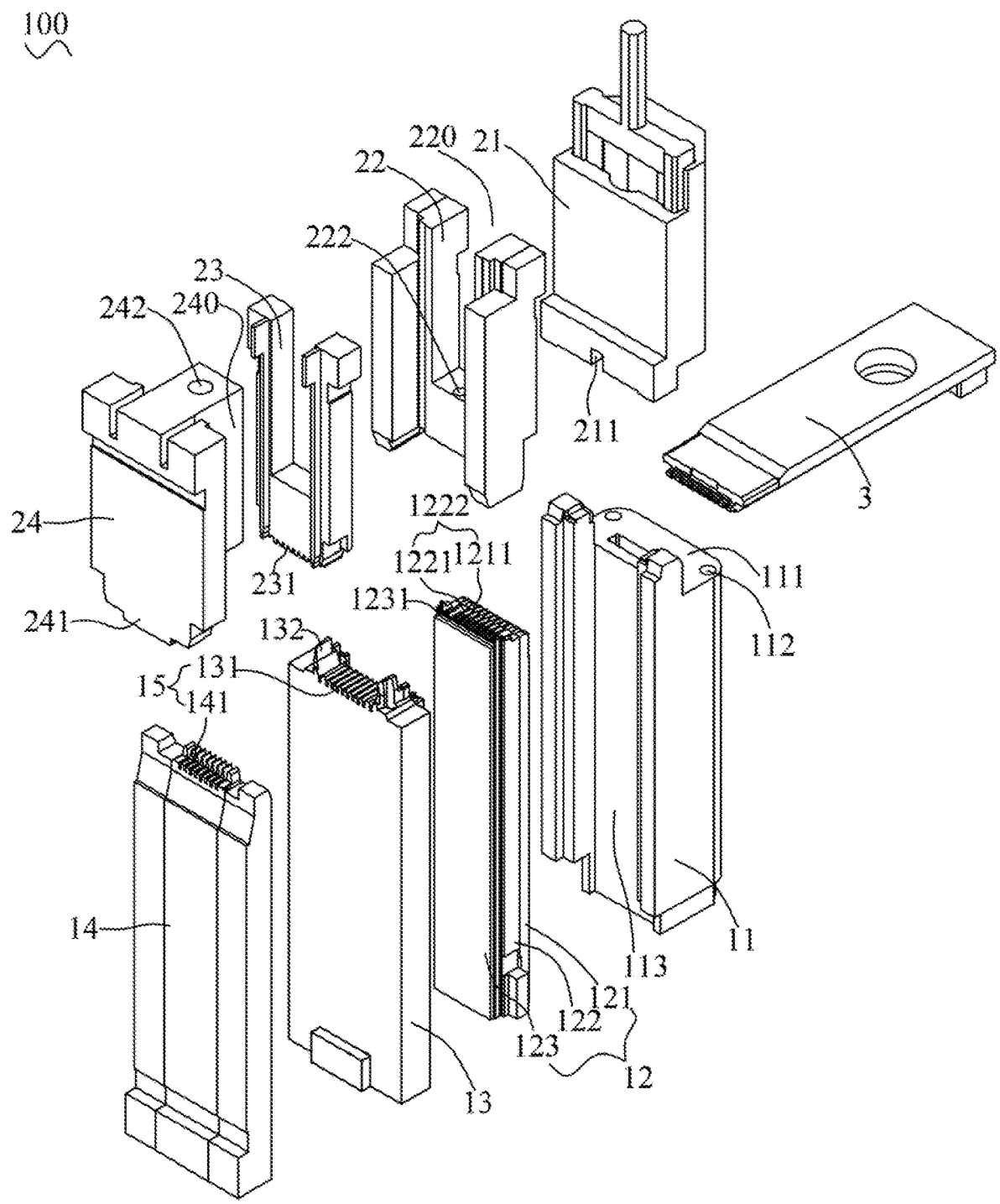
FIG. 2 is an exploded perspective view of the injection mold of FIG. 1.
Figure 3:
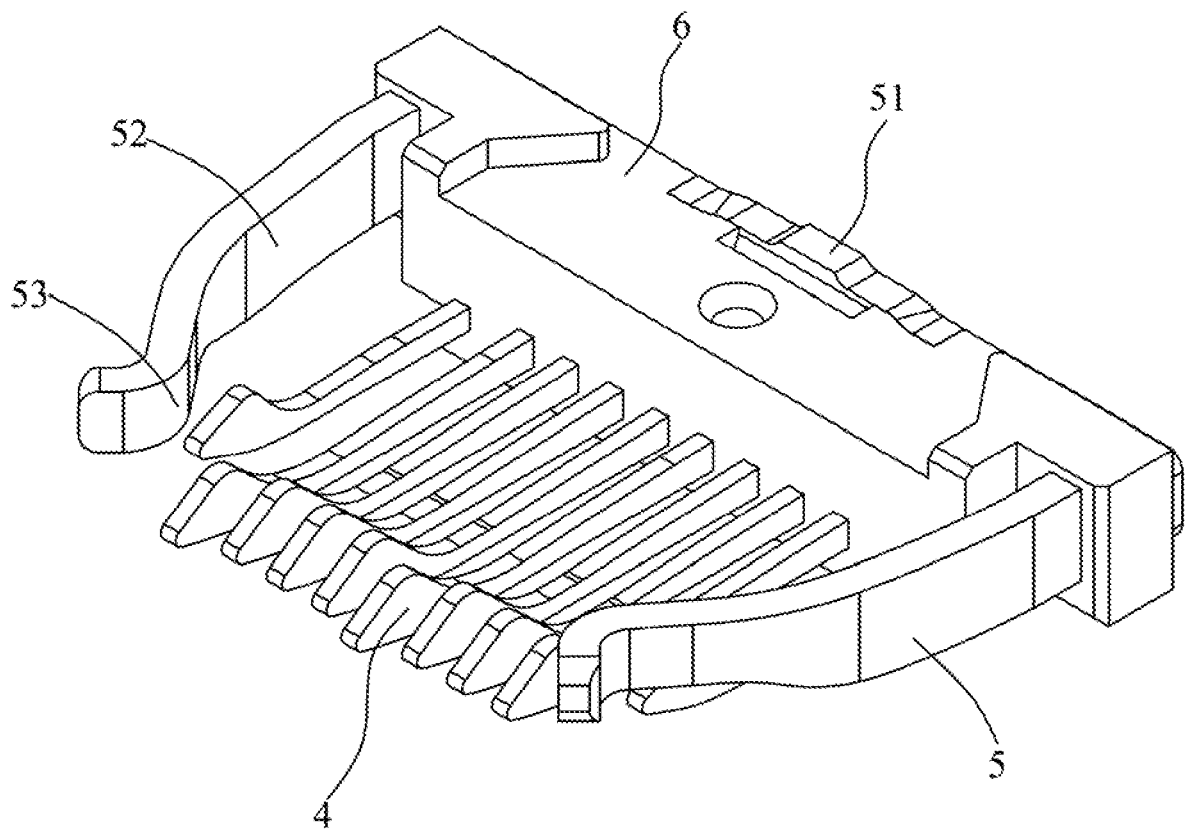
FIG. 3 is a perspective view of an electrical connector assembly, wherein the electrical connector assembly is injection molded in the injection mold of FIG. 1.
Figure 4:
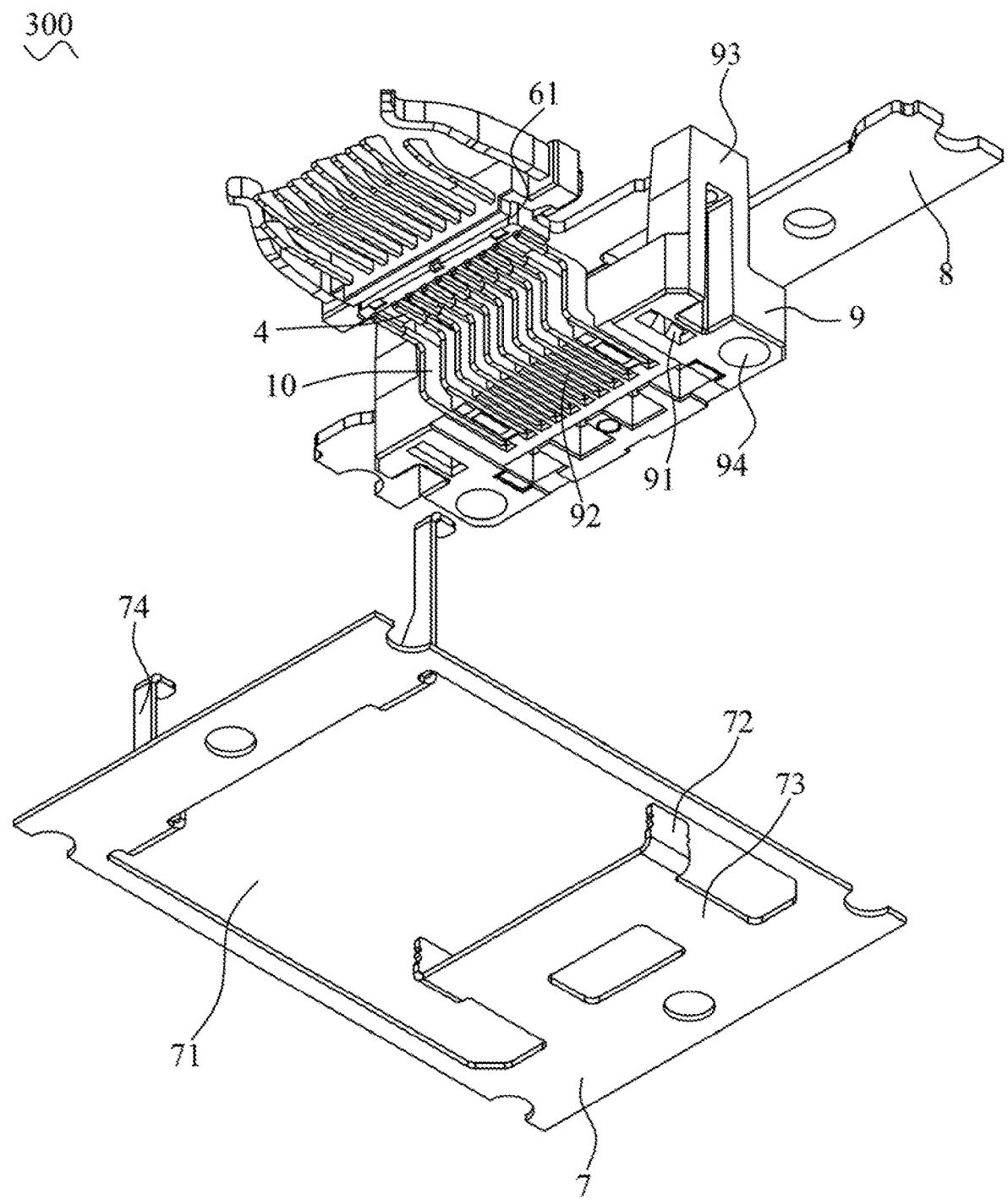
FIG. 4 is a perspective view of a processing component cooperates with the injection mold to manufacture the electrical connector assembly of FIG. 2.
Figure 8:
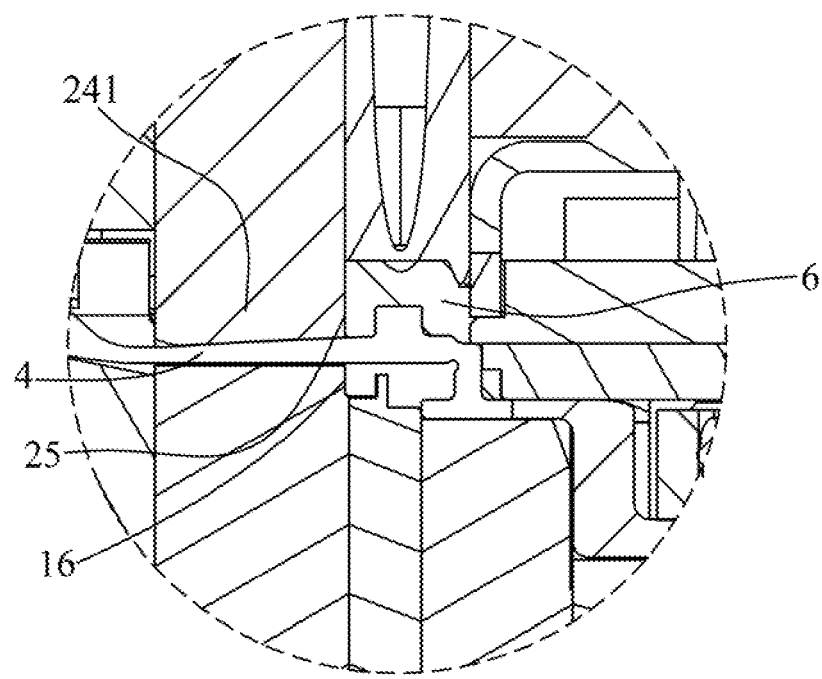
FIG. 8 is an enlarged view of an encircled portion VIII of the injection mold of FIG. 7.
Figure 9:
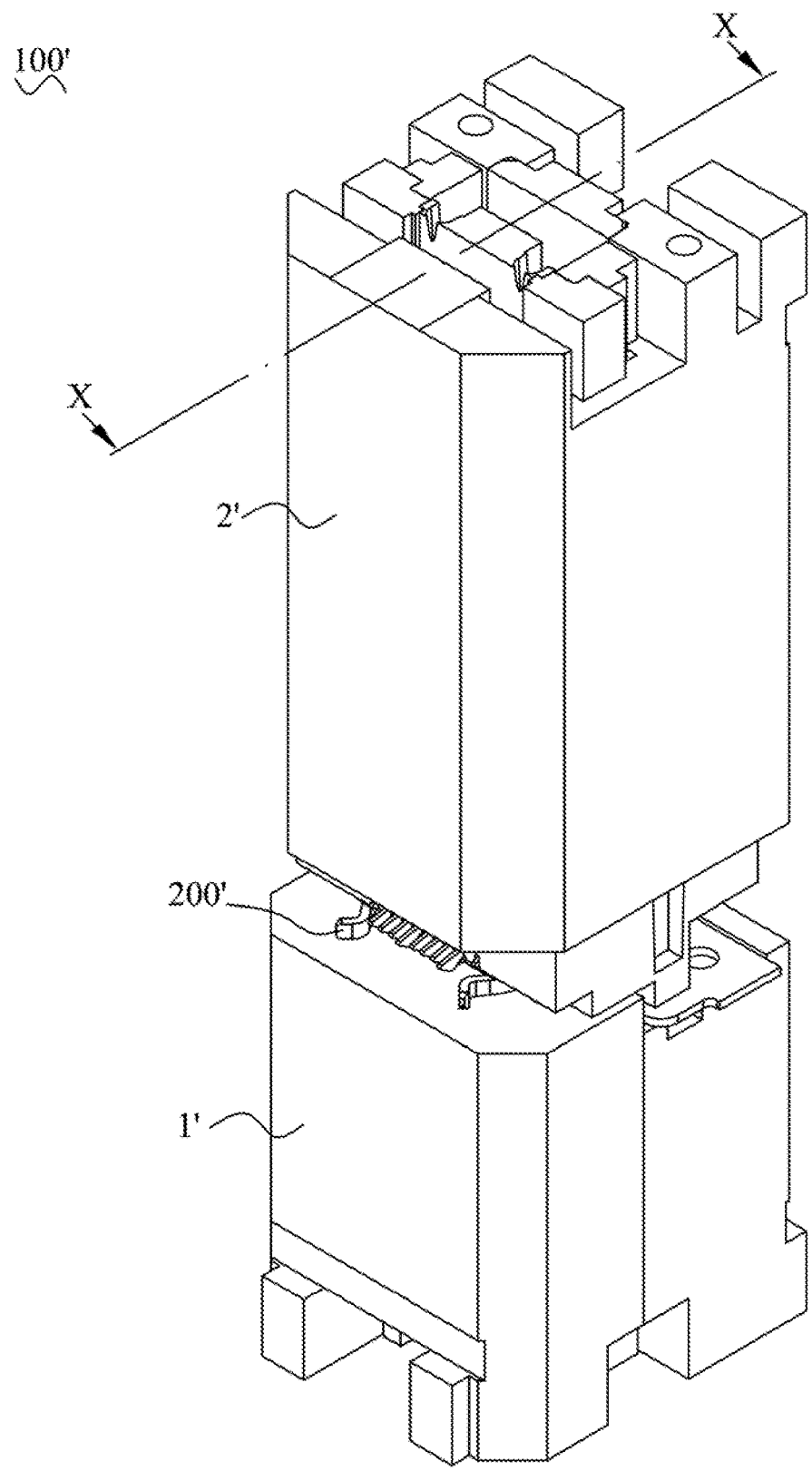
FIG. 9 is a perspective view of an injection mold in prior art.
Figure 10:
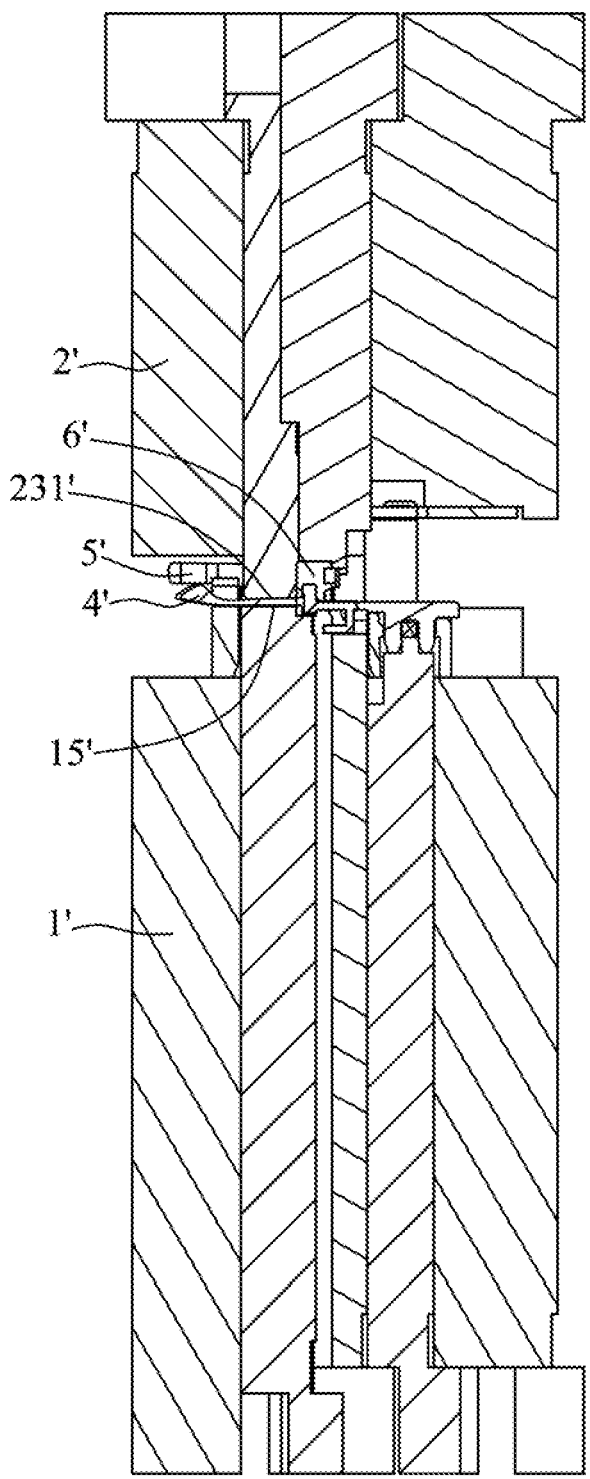
FIG. 10 is a cross-section view of the injection mold along a line X-X of FIG. 9.

With reference to FIG. 2 and FIG. 8, a top of the lower mold 1 has a plurality of lower terminal grooves 15 recessed downward. Two sides of the top of the lower mold 1 protrude upward to form two limiting blocks 132. A substantial middle of the top of the lower mold 1 is recessed downward to form a lower cavity 16. A rear of a top surface of the lower mold 1 is defined as an accommodating surface 111. The lower mold 1 defines a plurality of limiting slots 1222 penetrating through the top surface of the lower mold 1. The lower mold 1 includes a first lower molding block 11, a second lower molding block 12, a third lower molding block 13 and a fourth lower molding block 14. A top surface of the first lower molding block 11 is defined as the accommodating surface 111. The first lower molding block 11 opens at least one fixing hole 112 penetrating through the accommodating surface 111 and a bottom surface of the first lower molding block 11 along an up-down direction. The first lower molding block 11 opens two fixing holes 112. A middle of a front surface of the first lower molding block 11 is recessed rearward to form a notch 113 penetrating through the accommodating surface 111 and the bottom surface of the first lower molding block 11 along the up-down direction.

The second lower molding block 12 is mounted in the notch 113. The second lower molding block 12 includes a rear portion 121, a front portion 123 located in front of the rear portion 121, and a middle portion 122 located between the rear portion 121 and the front portion 123. A top of the rear portion 121 has a plurality of rear slots 1211 penetrating upward through the top of the rear portion 121 and arranged transversely. A top of the middle portion 122 has a plurality of front slots 1221 penetrating upward through the top of the middle portion 122 and arranged transversely. Each rear slot 1211 is corresponding to and communicated with one of the plurality of the front slots 1221 to form a limiting slot 1222. A top of the front portion 123 of the second lower molding block 12 extends upward to form a limiting board 1231.

The third lower molding block 13 is mounted on a front of the front portion 123 of the second lower molding block 12. A top of the third lower molding block 13 has a plurality of rear lower terminal grooves 131 recessed downward. Two sides of the top of the third lower molding block 13 protrude upward to form the two limiting blocks 132. The plurality of the rear lower terminal grooves 131 are located between the two limiting blocks 132.

The fourth lower molding block 14 is mounted to a front of the third lower molding block 13. A top of the fourth lower molding block 14 has a plurality of front lower terminal grooves 141 recessed downward. Each rear lower terminal groove 131 is communicated with and connected with one of the plurality of the front lower terminal grooves 141 to form one of the lower terminal grooves 15.

With reference to FIG. 2 to FIG. 8, the upper mold 2 engaged with and mounted on the lower mold 1, includes a first upper molding block 21, a second upper molding block 22, a third upper molding block 23 and a fourth upper molding block 24. A bottom of the upper mold 2 has a plurality of upper terminal grooves 231 recessed upward. A substantial middle of the bottom of the upper mold 2 is recessed upward to form an upper cavity 25 matched with the lower cavity 16. A bottom of the first upper molding block 21 is recessed upward to form an accommodating groove 211. The bottom of the upper mold 2 protrudes downward to form an abutting block 241.

The second upper molding block 22 is mounted to a front of the first upper molding block 21. A bottom of the second upper molding block 22 protrudes downward to form a convex block 221. A middle of a top of the second upper molding block 22 is recessed downward to form a locating groove 220. A bottom wall of the locating groove 220 opens a lower injection hole 222 penetrating through the bottom wall of the locating groove 220 along the up-down direction.

The third upper molding block 23 is mounted to a front of the second upper molding block 22. A bottom of the third upper molding block 23 has the plurality of upper terminal grooves 231 recessed upward. Each of the plurality of the upper terminal grooves 231 is corresponding to one of the plurality of the lower terminal grooves 15.

The fourth upper molding block 24 is mounted to a front of the third upper molding block 23. A bottom of the fourth upper molding block 24 protrudes downward to form the abutting block 241. A middle of a rear of the fourth upper molding block 24 protrudes rearward to form an insertion portion 240 matched with the locating groove 220. The insertion portion 240 opens an upper injection hole 242 penetrating through the rear of the fourth upper molding block 24 along the up-down direction. The insertion portion 240 is inserted into the locating groove 220. The insertion portion 240 is located on the bottom wall of the locating groove 220. The upper injection hole 242 is corresponding to and communicated with the lower injection hole 222 to form an injection hole 201.

With reference to FIG. 1 to FIG. 7, the electrical connector assembly 200 is molded in the injection mold 100 by an injection molding technology. The electrical connector assembly 200 includes a plurality of terminals 4, a clamping component 5, and a base body 6 fastened to the plurality of the terminals 4 and the clamping component 5. The clamping component 5 is of a substantially U shape. A mouth of the clamping component 5 faces frontward. The clamping component 5 has a fixing portion 51 extending transversely. Two ends of the fixing portion 51 are bent frontward and extend frontward to form a pair of clamping arms 52. Two free ends of the pair of the clamping arms 52 are arched inward to form two clamping portions 53 facing each other. The base body 6 is integrally molded to middles of the plurality of the terminals 4 and the fixing portion 51 of the clamping component 5 in the injection mold 100. A middle of a bottom surface of the base body 6 is recessed upward to form an indentation 61.

When the lower mold 1 and the upper mold 2 are engaged with each other, a molding cavity 202 is formed between the second upper molding block 22 of the upper mold 2 and the second lower molding block 12 of the lower mold 1. The upper cavity 25 is integrated with the lower cavity 16 to form the molding cavity 202 for molding the base body 6 to the plurality of the terminals 4 and the clamping component 5. The filling block 3 is inserted frontward and supported between the lower mold 1 and the upper mold 2, and blocks a rear of the molding cavity 202.

With reference to FIG. 1 to FIG. 5, a processing component 300 which cooperates with the injection mold 100 to manufacture the electrical connector assembly 200. The processing component 300 includes a material carrier 7, a material belt 8, a fixing block 9 and a plurality of positioning portions 10. The material carrier 7 opens an opening 71. A rear inner side wall of the opening 71 extends frontward to form an extending piece 73. Fronts of two sides of the extending piece 73 are bent upward to form two protruding pieces 72. Two sides of a front inner side wall of the opening 71 extend upward and then are bent rearward to form two restricting portions 74.

The material belt 8 is formed on a rear of the clamping component 5 by a stamping technology. The material belt 8 has a connecting portion 81 bent upward and then extending rearward from a middle of the rear of the clamping component 5, a fastening portion 82 extended transversely and oppositely from rears of two sides of the connecting portion 81, and an auxiliary portion 83 extended rearward, and then extended transversely and oppositely from a middle of a rear of the fastening portion 82.

The clamping component 5 is of a substantially lying U shape. The mouth of the clamping component 5 faces frontward. Two sides of a bottom surface of the fixing block 9 are recessed upward to form two locating slots 91 spaced from each other. The two locating slots 91 are corresponding to the two protruding pieces 72, respectively. Several portions of the bottom surface of the fixing block 9 are recessed upward to form a plurality of insertion slots 92 located between the two locating slots 91. Two sides of a top surface of the fixing block 9 protrude upward to form two supporting blocks 93. A top surface of each supporting block 93 is recessed downward to form a fixing slot 931. The fixing block 9 opens two fastening holes 94 vertically penetrating through the fixing block 9 and located behind the two supporting blocks 93. When each positioning portion 10 is formed by a stamping technology, the plurality of the positioning portions 10 are formed at rears of the plurality of the terminals 4.

Figure 5:
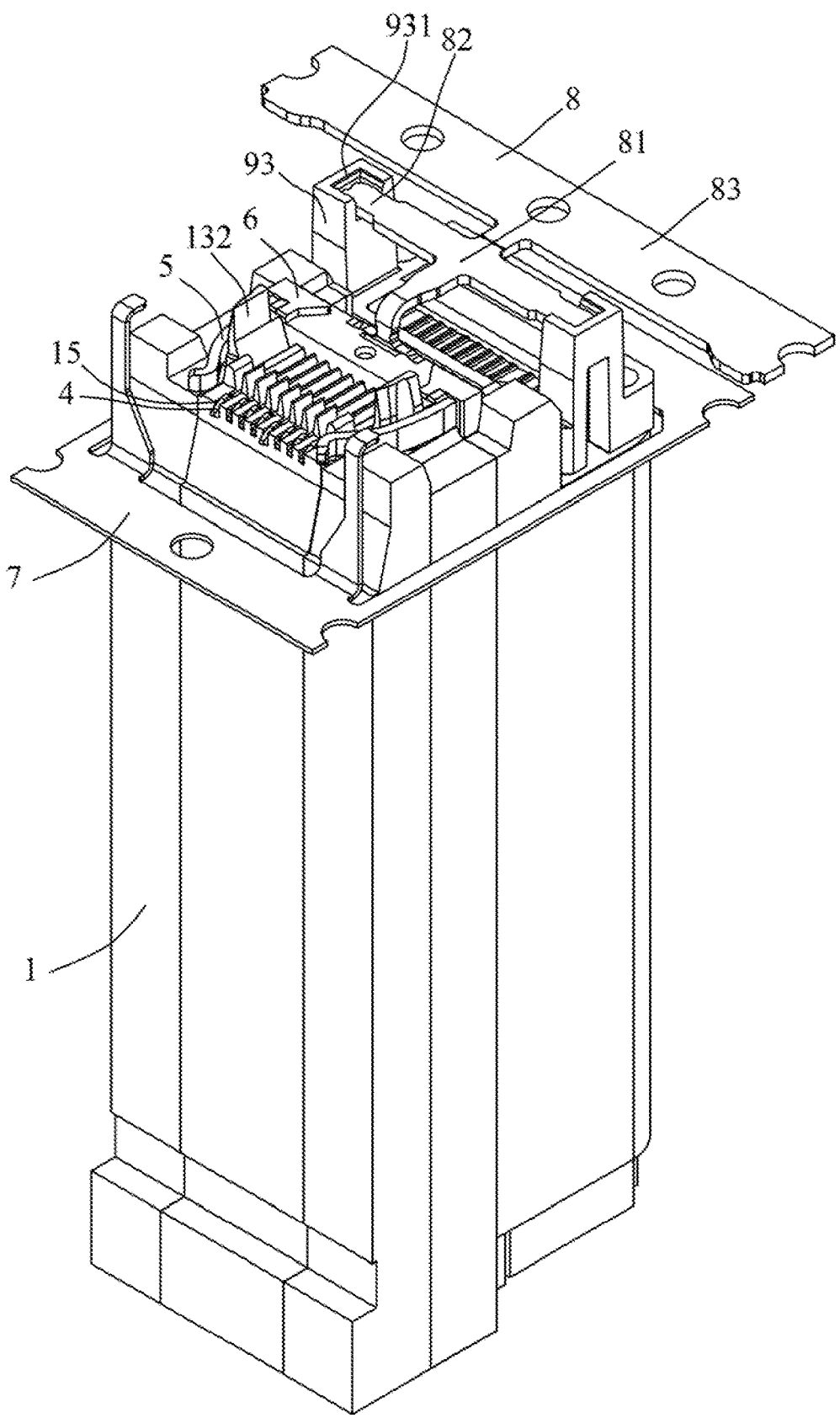
FIG. 5 is a perspective view of a lower mold of the injection mold of FIG. 1, wherein the electrical connector assembly is in the lower mold of the injection mold of FIG. 1.
Figure 6:
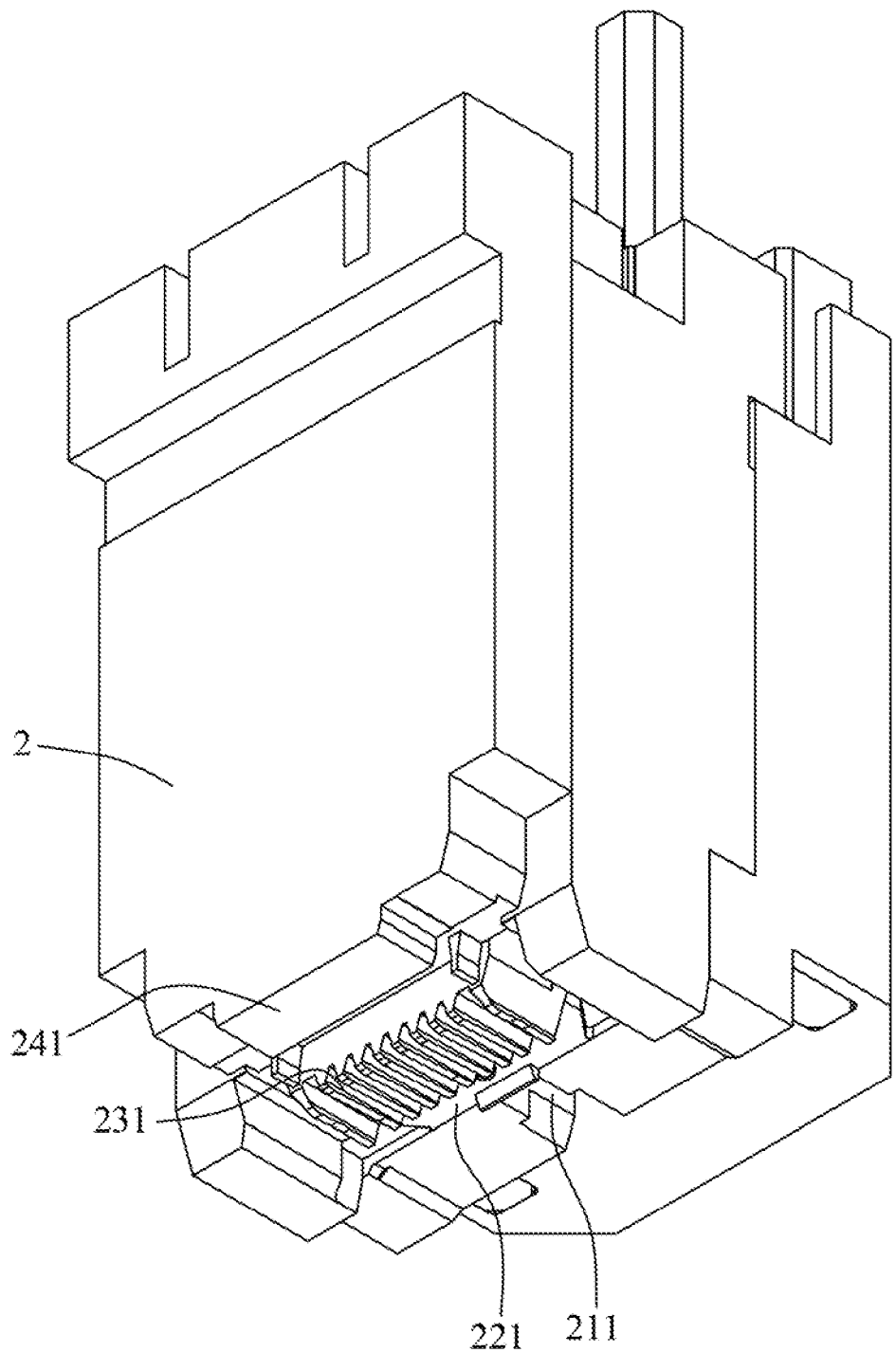
FIG. 6 is a perspective view of an upper mold of the injection mold of FIG. 1.
Figure 7:
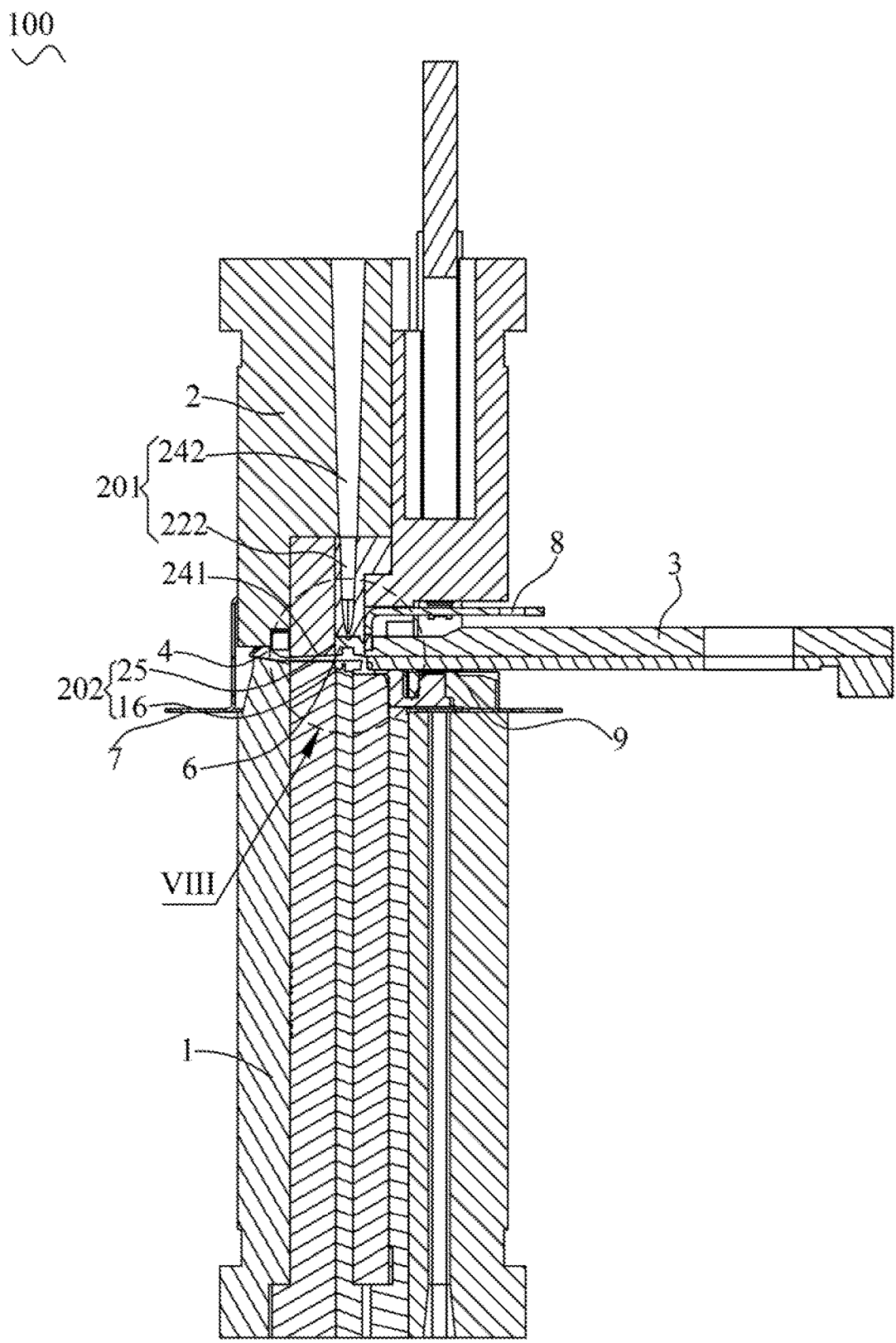
FIG. 7 is a cross-section view of the injection mold along a line VII-VII of FIG. 1.

With reference to FIG. 5 and FIG. 7, when the injection mold 100 manufactures the electrical connector assembly 200, specific steps of manufacturing the electrical connector assembly 200 are described as follows. Firstly, upper portions of the plurality of the positioning portions 10 are installed in the plurality of the insertion slots 92. At the moment, the plurality of the terminals 4 are connected to fronts of the plurality of the positioning portions 10. Secondly, two ends of the fastening portion 82 of the material belt 8 are assembled in the two fixing slots 931 of the two supporting blocks 93. At this moment, the clamping component 5 is located above the plurality of the terminals 4.

Thirdly, the two protruding pieces 72 of the material carrier 7 are assembled in the two locating slots 91 of the fixing block 9, respectively, at this moment, the plurality of the terminals 4 are located above the opening 71. Fourthly, the material carrier 7 is sleeved around the lower mold 1. At this moment, the fixing block 9 is placed on the accommodating surface 111 of the lower mold 1. An upper portion of each positioning portion 10 is placed in one of the plurality of the insertion slots 92. A lower portion of each positioning portion 10 is limited in one of the plurality of the limiting slots 1222. The two fastening holes 94 of the fixing block 9 are communicated with the two fixing holes 112 of the lower mold 1. The injection mold 100 further includes two fixing elements (not shown). The two fixing elements pass through the two fastening holes 94 of the fixing block 9 and the two fixing holes 112 of the lower mold 1, so that the fixing block 9 is fixed on the accommodating surface 111 of the lower mold 1. An automatic pulling machine (not shown) is used for locating the material carrier 7 to proceed a continuous operation, and the material carrier 7 is capable of being cut automatically in a next operation process and the electrical connector assembly 200 is injection molded by an automatic assembling operation, so a manufacturing efficiency and a yield is higher, and a manufacturing cost is lowered and a competitiveness is enhanced.

Lower portions of the plurality of the terminals 4 are placed in the plurality of the lower terminal grooves 15, and the clamping component 5 is placed on the second lower molding block 12 of the lower mold 1. The limiting board 1231 is limited in the indentation 61. The two limiting blocks 132 abut against two inner sides of the clamping component 5. The two limiting blocks 132 abut against two inner sides of the pair of the clamping arms 52, respectively. Then, the upper mold 2 is engaged with the lower mold 1 along the up-down direction. At this moment, the connecting portion 81 of the material belt 8 is placed in the accommodating groove 211 of the first upper molding block 21. Middles of upper portions of the plurality of the terminals 4 are placed in the plurality of the upper terminal grooves 231. A bottom of the abutting block 241 abuts against front ends of the upper portions of the plurality of the terminals 4, and two sides of the abutting block 241 abut against inner sides of the two clamping portions 53 of the clamping component 5. The filling block 3 is inserted forward between the lower mold 1 and the upper mold 2, and abuts against a rear surface of the fixing portion 51 of the clamping component 5. Finally, a mold flow is injected from the injection hole 201, and the base body 6 is molded to the plurality of the terminals 4 and the clamping component 5, so that the electrical connector assembly 200 is completed being manufactured. Thus the plurality of the terminals 4 and the clamping component 5 are fixed between the upper mold 2 and the lower mold 1 firmly in a process of molding the base body 6 to the plurality of the terminals 4 and the clamping component 5. So the injection mold 100 is with a fixing function and is capable of improving a production yield of the electrical connector assembly 200.

As described above, a front of the upper mold 2 of the injection mold 100 is equipped with the abutting block 241, when the electrical connector assembly 200 is manufactured in the injection mold 100, the bottom of the abutting block 241 abuts against the front ends of the upper portions of the plurality of the terminals 4, and the two sides of the abutting block 241 abut against the inner sides of the two clamping portions 53 of the clamping component 5, the plurality of the terminals 4 and the clamping component 5 may be more firmly fixed in the injection mold 100, so that in an injection molding process of the base body 6, the plurality of the terminals 4 are prevented from generating a displacement by an influence of the mold flow, and the electrical connector assembly 200 may be stably and well manufactured. As a result, the production yield of the electrical connector assembly 200 is improved during a mass production process.

What is claimed is:

1. An injection mold adapted for molding an electrical connector assembly which includes a plurality of terminals, a clamping component located above the plurality of the terminals, and a base body fastened to the plurality of the terminals and the clamping component, the injection mold comprising:

a lower mold, a top of the lower mold having a plurality of lower terminal grooves recessed downward, two sides of the top of the lower mold protruding upward to form two limiting blocks, lower portions of the plurality of the terminals being placed in the plurality of the lower terminal grooves, the clamping component being placed on the lower mold, the two limiting blocks abutting against two inner sides of the clamping component; and an upper mold engaged with and mounted on the lower mold, a molding cavity being formed between the upper mold and the lower mold for molding the base body to the plurality of the terminals and the clamping component, a bottom of the upper mold having a plurality of upper terminal grooves recessed upward, each of the plurality of the upper terminal grooves being corresponding to one of the plurality of the lower terminal grooves, upper portions of the plurality of the terminals being placed in the plurality of the upper terminal grooves, the bottom of the upper mold protruding downward to form an abutting block, a bottom of the abutting block abutting against front ends of the upper portions of the plurality of the terminals, the plurality of the terminals and the clamping component being fixed between the upper mold and the lower mold firmly in a process of molding the base body to the plurality of the terminals and the clamping component.

2. The injection mold as claimed in claim 1, wherein the lower mold includes a first lower molding block, a second lower molding block, a third lower molding block and a fourth lower molding block, a top surface of the first lower molding block is defined as an accommodating surface, the first lower molding block opens at least one fixing hole penetrating through the accommodating surface and a bottom surface of the first lower molding block along an up-down direction, a front surface of the first lower molding block is recessed rearward to form a notch, the second lower molding block is mounted in the notch, the third lower molding block is mounted on a front of second lower molding block, the fourth lower molding block is mounted to a front of the third lower molding block.

3. The injection mold as claimed in claim 2, wherein the second lower molding block includes a rear portion, a front portion located in front of the rear portion, and a middle portion located between the rear portion and the front portion, a top of the rear portion has a plurality of rear slots penetrating upward through the top of the rear portion and arranged transversely, a top of the middle portion has a plurality of front slots penetrating upward through the top of the middle portion and arranged transversely, each rear slot is corresponding to and communicated with one of the plurality of the front slots to form a limiting slot, a processing component which cooperates with the injection mold to manufacture the electrical connector assembly, includes a plurality of positioning portions formed at rears of the plurality of the terminals, a lower portion of each positioning portion is limited in the limiting slot.

4. The injection mold as claimed in claim 3, wherein the processing component further comprises a fixing block, several portions of a bottom surface of the fixing block are recessed upward to form a plurality of insertion slots, an upper portion of each positioning portion is placed in one of the plurality of the insertion slots.

5. The injection mold as claimed in claim 3, wherein a top of the front portion of the second lower molding block extends upward to form a limiting board, a middle of a bottom surface of the base body is recessed upward to form an indentation, the limiting board is limited in the indentation.

6. The injection mold as claimed in claim 2, wherein two sides of a top of the third lower molding block protrude upward to form the two limiting blocks, the clamping component has a fixing portion extending transversely, two ends of the fixing portion are bent frontward and extend frontward to form a pair of clamping arms, the two limiting blocks abut against two inner sides of the pair of the clamping arms, respectively.

7. The injection mold as claimed in claim 2, wherein a top of the third lower molding block has a plurality of rear lower terminal grooves recessed downward, a top of the fourth lower molding block has a plurality of front lower terminal grooves recessed downward, each rear lower terminal groove is communicated with and connected with one of the plurality of the front lower terminal grooves to form one of the lower terminal grooves.

8. The injection mold as claimed in claim 2, wherein the upper mold includes a first upper molding block, a second upper molding block, a third upper molding block and a fourth upper molding block, the second upper molding block is mounted to a front of the first upper molding block, the third upper molding block is mounted to a front of the second upper molding block, the fourth upper molding block is mounted to a front of the third upper molding block, a bottom of the third upper molding block has the plurality of the upper terminal grooves recessed upward.

9. The injection mold as claimed in claim 8, wherein a bottom of the first upper molding block is recessed upward to form an accommodating groove, a material belt is formed on a rear of the clamping component, the material belt has a connecting portion, the connecting portion of the material belt is placed in the accommodating groove.

10. The injection mold as claimed in claim 8, wherein a bottom of the second upper molding block protrudes downward to form a convex block, the convex block cooperates with a top of the base body.

11. The injection mold as claimed in claim 8, wherein a middle of a top of the second upper molding block is recessed downward to form a locating groove, a middle of a rear of the fourth upper molding block protrudes rearward to form an insertion portion matched with the locating groove, the insertion portion opens an upper injection hole penetrating through the rear of the fourth upper molding block along an up-down direction, a bottom wall of the locating groove opens a lower injection hole penetrating through the bottom wall of the locating groove along the up-down direction, the upper injection hole is corresponding to and communicated with the lower injection hole to form an injection hole, a mold flow is injected into the injection mold from the injection hole, and the base body is molded to the plurality of the terminals and the clamping component.

12. The injection mold as claimed in claim 8, further comprising a filling block cooperating with the lower mold and the upper mold, when the lower mold and the upper mold are engaged with each other, the molding cavity being formed between the second upper molding block of the upper mold and the second lower molding block of the lower mold, the filling block being inserted frontward and supported between the lower mold and the upper mold, and blocking a rear of the molding cavity.

13. The injection mold as claimed in claim 1, wherein a substantial middle of the top of the lower mold is recessed downward to form a lower cavity, a substantial middle of the bottom of the upper mold is recessed upward to form an upper cavity matched with the lower cavity, the upper cavity is integrated with the lower cavity to form the molding cavity.

14. The injection mold as claimed in claim 1, wherein a processing component which cooperates with the injection mold to manufacture the electrical connector assembly, includes a fixing block, and a material belt which has a connecting portion bent upward and then extending rearward from a middle of a rear of the clamping component, and a fastening portion extended transversely and oppositely from rears of two sides of the connecting portion, two sides of a top surface of the fixing block protrude upward to form two supporting blocks, a top surface of each supporting block is recessed downward to form a fixing slot, two ends of the fastening portion of the material belt are assembled in the two fixing slots of the two supporting blocks.

15. The injection mold as claimed in claim 14, wherein the processing component includes a material carrier, the material carrier is sleeved around the lower mold.

16. The injection mold as claimed in claim 15, wherein two sides of a bottom surface of the fixing block are recessed upward to form two locating slots spaced from each other, the material carrier opens an opening, a rear inner side wall of the opening extends frontward to form an extending piece, fronts of two sides of the extending piece are bent upward to form two protruding pieces, the two protruding pieces are assembled in the two locating slots, respectively.

17. An injection mold adapted for molding an electrical connector assembly which includes a plurality of terminals, a clamping component, and a base body fastened to the plurality of the terminals and the clamping component, the injection mold comprising:
  a lower mold, a top of the lower mold having a plurality of lower terminal grooves recessed downward, lower portions of the plurality of the terminals being placed in the plurality of the lower terminal grooves, a rear of a top surface of the lower mold being defined as an accommodating surface; and
  an upper mold engaged with and mounted on the lower mold, a molding cavity being formed between the upper mold and the lower mold for molding the base body to the plurality of the terminals and the clamping component, a bottom of the upper mold having a plurality of upper terminal grooves recessed upward, each of the plurality of the upper terminal grooves being corresponding to one of the plurality of the lower terminal grooves, upper portions of the plurality of the terminals being placed in the plurality of the upper terminal grooves, the bottom of the upper mold protruding downward to form an abutting block, a bottom of the abutting block abutting against front ends of the upper portions of the plurality of the terminals;
  wherein a fixing block is placed on the accommodating surface, two sides of a top surface of the fixing block protrude upward to form two supporting blocks, a top surface of each supporting block is recessed downward to form a fixing slot, a material belt formed on a rear of the clamping component, the material belt has a connecting portion bent upward and then extending rearward from the rear of the clamping component, and a fastening portion extended transversely and oppositely from rears of two sides of the connecting portion, two ends of the fastening portion are assembled in the two fixing slots of the two supporting blocks, the plurality of the terminals and the clamping component are fixed between the upper mold and the lower mold firmly in a process of molding the base body to the plurality of the terminals and the clamping component.

18. An injection mold adapted for molding an electrical connector assembly which includes a plurality of terminals, a clamping component, and a base body fastened to the plurality of the terminals and the clamping component, the injection mold comprising:

a lower mold, a top of the lower mold having a plurality of lower terminal grooves recessed downward, two sides of the top of the lower mold protruding upward to form two limiting blocks, lower portions of the plurality of the terminals being placed in the plurality of the lower terminal grooves, the clamping component being placed on the lower mold, the two limiting blocks abutting against two inner sides of the clamping component, the lower mold defining a plurality of limiting slots penetrating through a top surface of the lower mold; and an upper mold engaged with and mounted on the lower mold, a molding cavity being formed between the upper mold and the lower mold for molding the base body to the plurality of the terminals and the clamping component, a bottom of the upper mold having a plurality of upper terminal grooves recessed upward, each of the plurality of the upper terminal grooves being corresponding to one of the plurality of the lower terminal grooves, upper portions of the plurality of the terminals being placed in the plurality of the upper terminal grooves, the bottom of the upper mold protruding downward to form an abutting block, a bottom of the abutting block abutting against front ends of the upper portions of the plurality of the terminals, the plurality of the terminals and the clamping component are fixed between the upper mold and the lower mold firmly in a process of molding the base body to the plurality of the terminals and the clamping component;

wherein a processing component which cooperates with the injection mold to manufacture the electrical connector assembly, includes a fixing block, and a plurality of positioning portions formed at rears of the plurality of the terminals, a lower portion of each positioning portion is limited in one of the plurality of the limiting slots, several portions of a bottom surface of the fixing block are recessed upward to form a plurality of insertion slots, an upper portion of each positioning portion is placed in one of the plurality of the insertion slots.

* * * * *